US012768431B2

(12) United States Patent
Coenen et al.

(10) Patent No.: US 12,768,431 B2
(45) Date of Patent: Oct. 20, 2026

(54) THREE SPEED ELECTRIC VEHICLE TRANSMISSION

(71) Applicant: DANA BELGUIUM, Bruges (BE)

(72) Inventors: Pauwel Coenen, Aalter (BE); Filip D. Schacht, Meulebeke (BE); Kurt Cattoor, Koolkerke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/957,078

(22) Filed: Nov. 22, 2024

(65) Prior Publication Data

US 2025/0196628 A1 Jun. 19, 2025

Related U.S. Application Data

(60) Provisional application No. 63/609,497, filed on Dec. 13, 2023.

(51) Int. Cl.

| | |
|---|---|
| ***F16H 3/091*** | (2006.01) |
| ***B60K 1/02*** | (2006.01) |
| ***B60K 17/02*** | (2006.01) |
| ***B60K 17/08*** | (2006.01) |
| ***F16H 3/093*** | (2006.01) |

(52) U.S. Cl.

CPC ............... *F16H 3/091* (2013.01); *B60K 1/02* (2013.01); *B60K 17/02* (2013.01); *B60K 17/08* (2013.01); *F16H 3/093* (2013.01); *F16H 2200/0021* (2013.01); *F16H 2200/0039* (2013.01)

(58) Field of Classification Search

CPC .. F16H 3/091; F16H 3/093; F16H 2200/0021; F16H 2200/039; B60K 1/02; B60K 17/08

See application file for complete search history.

(56) References Cited

U.S. PATENT DOCUMENTS 5,609,072 A * 3/1997 Lequis .................. F16H 57/021 74/420
2021/0379978 A1 12/2021 Van Dingenen et al.

FOREIGN PATENT DOCUMENTS

DE 19932118 C1 * 10/2000 ............. B60K 17/04
DE 102011084623 A1 4/2013
WO WO-0120195 A1 * 3/2001 ........... F16H 57/021
WO 2020078596 A1 4/2020

OTHER PUBLICATIONS

Rinaldi, P. et al., "System and Method for Shifting in a Dual Motor Transmission," U.S. Appl. No. 18/450,951, filed Aug. 16, 2023, 39 pages.
Schacht, F. et al., "Systems and Method for an Electric Powertrain," U.S. Appl. No. 18/629,784, filed Apr. 8, 2024, 20 pages.

* cited by examiner

*Primary Examiner* — William C Joyce
(74) *Attorney, Agent, or Firm* — McCoy Russell LLP

(57) ABSTRACT

Systems and methods are herein provided for a three-speed electric transmission system. In one example, a transmission system comprises a first electric motor coupled to an input speed reduction gear train, wherein the input speed reduction gear train rotationally couples to an input shaft; a second electric motor coupled to the input speed reduction gear train; a first clutch positioned on a first clutch shaft; a second clutch positioned on the input shaft; a third clutch positioned on a second clutch shaft; and an output shaft rotationally coupled to the second clutch shaft, wherein the output shaft is in one of a first position and a second position.

20 Claims, 8 Drawing Sheets

600

| | First Clutch | Second Clutch | Third Clutch |
|---|---|---|---|
| First Gear Ratio | Engaged | Disengaged | Disengaged |
| Second Gear Ratio | Disengaged | Engaged | Disengaged |
| Third Gear Ratio | Disengaged | Disengaged | Engaged |

FIG. 6

THREE SPEED ELECTRIC VEHICLE TRANSMISSION

CROSS REFERENCE TO RELATED APPLICATIONS

The present application claims priority to U.S. Provisional Application No. 63/609,497 entitled "THREE SPEED ELECTRIC VEHICLE TRANSMISSION", filed on Dec. 13, 2023. The entire contents of the above-listed application is hereby incorporated by reference for all purposes.

TECHNICAL FIELD

Embodiments of the subject matter disclosed herein relate to electric vehicles, and more specifically to electric vehicle transmission systems.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Electric drive units often comprise transmission that include a plurality of clutches, gears, and shafts to transfer mechanical power from one or more motors to downstream components. Further, dual-motor systems have been utilized in some electric drive units to increase the drive units' power output and control adaptability. Improving efficiency and optimizing functionality of a transmission design allows for better performance of vehicles, especially electric and hybrid vehicles, which employ the transmission. Thus, a transmission with greater versatility may achieve higher efficiency and improved function of a broader range of vehicle types.

Some examples of such electric drive units of electric vehicles include a dual-motor drive unit where the motors are arranged on the same side of the transmission as well as multiple gears or clutches positioned on an output shaft. Further, some transmission systems of electric drive units include countershaft layouts as opposed planetary systems. However, high input speeds from the motors may result in degradation to internal components such as clutches and gears. Further, different applications may have different packaging demands. For example, loader-type vehicles may demand transmissions with a long drop from a main section of the transmission to the output because the transmission is assembled within the loader vertically higher with respect to the axles than other types of vehicles. Other types of vehicles, such as on-highway vehicles, may demand a short drop from the main section the transmission to the output. Because of this, certain transmission system layouts may not be applicable to multiple vehicle applications.

The inventors herein have recognized several drawbacks to such electric drive units. For example, including multiple gears or clutches on the output shaft increases the width of the transmission which may pose barriers to integration in certain vehicle platforms. Further, certain drop configurations may be incompatible in certain vehicles that demand shorter or longer drops due to packaging demands of surrounding vehicle systems, such as the long drop demanded by loaders. Further, due to the layout of clutches and associated gear reductions on downstream shafts included in previous electric drive units, the unit's width may not meet packaging demands of some vehicles. Additionally, high input speeds from electric motors may result in degradation to transmission components.

The inventors herein have recognized the aforementioned issues and developed a transmission system in an electric drive unit that at least partially addresses these issues. The electric drive unit, in one example, includes two electric motors and a transmission. The transmission may be a three speed electric transmission that comprises a plurality of clutches, a plurality of gears, and a plurality of shafts. The transmission system comprises a first clutch, a second clutch, and a third clutch each positioned on a different shaft. Selective engagement of clutches provides three gear ratios and as such three speeds.

In all embodiments, the transmission system allows for flexibility in an output shaft location. The output shaft may be arranged in a short drop configuration where an axis of an input shaft and an axis of the output shaft are close to aligning or long-drop configuration where the axis of the input shaft and the axis of the output shaft are distanced further apart. The flexibility allows for a choice between the two configurations depending on the application, whereby the transmission system may be configured with a long drop configuration for applications that demand distance between input and output, such as loaders, or with a short drop configuration for applications that demand less distance between input and output. In this way, a single transmission design may be used for several vehicle types, rather than several transmissions with each being more specific to a certain vehicle type. Hence, a single more versatile transmission may reduce cost and complexity of manufacturing compared to producing multiple more limited transmission designs.

Further, the transmission system herein described is designed with flexibility of torque to speed ratio may be able to adapt to a broader range of driving conditions, including both on- and off-road driving. For driving conditions which require high torque, relatively high input speed is generally required. However, a transmission design which reduces input speed requirements and therefore speeds of internal components within a gearbox may minimize stress on components of the gearbox, thereby preventing failure of the components and prolonging a lifetime of the transmission. Speed reduction may also reduce drag losses on wet clutches, therefore efficiency may be increased with such a transmission.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table of exemplary operational gear and clutch engagements of the three-speed transmission system according to the first and second embodiments.

DETAILED DESCRIPTION

The following description relates to systems and methods for a three-speed countershaft transmission for an electric vehicle comprising two electric motors. The transmission system includes a plurality of clutches, shafts, and gears. In particular, the transmission system includes an input shaft on which a second clutch is positioned, a first clutch shaft on which a first clutch is positioned, a second clutch shaft on which a third clutch is positioned, and an output shaft. In a first configuration, the output shaft is in a short drop arrangement position. In a second configuration, the output shaft is in a long drop arrangement position. The transmission system, in either configuration, provides for three speeds from three gear ratios and is configurable into either of the output shaft position embodiments based on vehicle platform demands.

Figure 1:
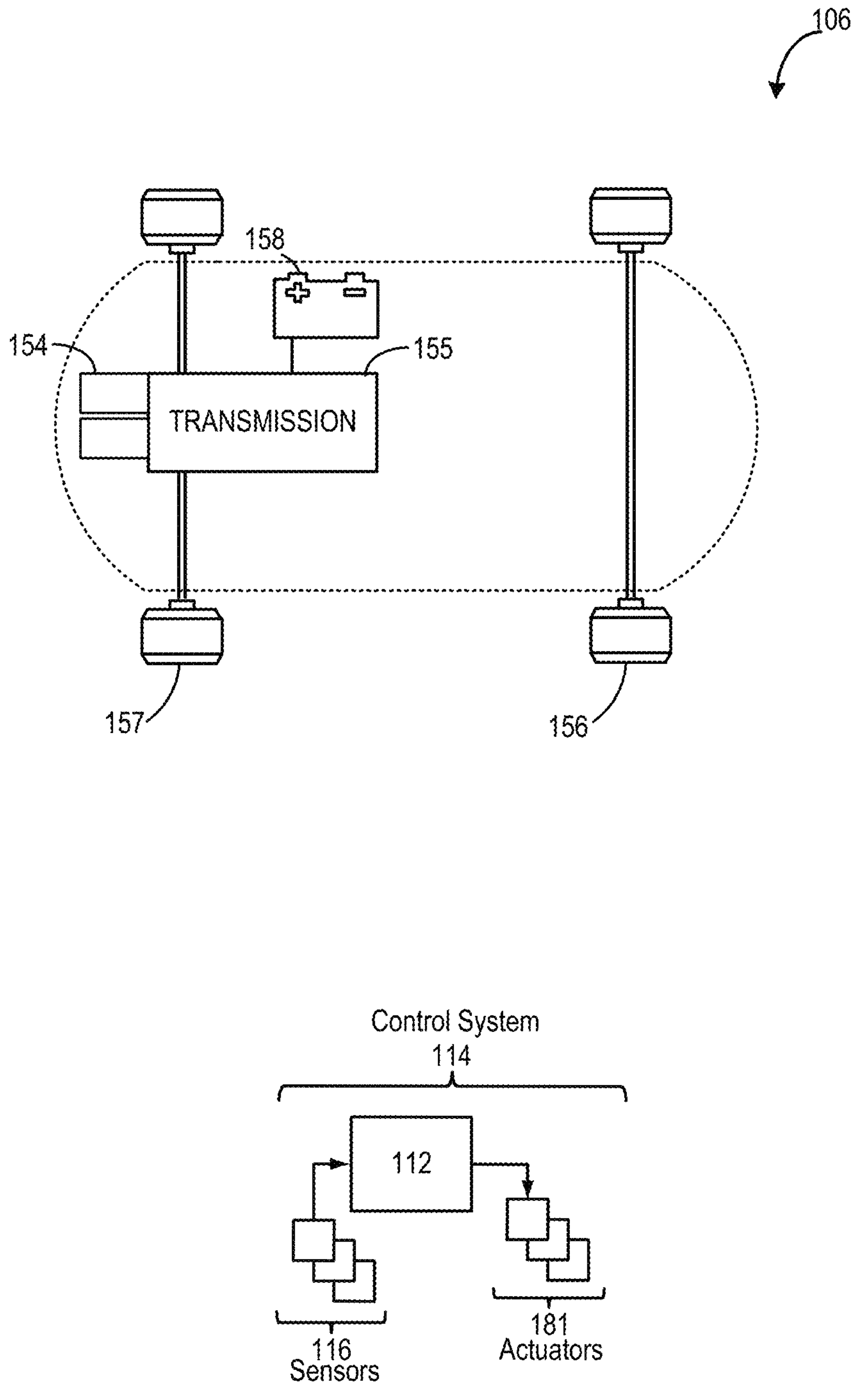
FIG. 1 shows a schematic of an exemplary vehicle.
Figure 2:
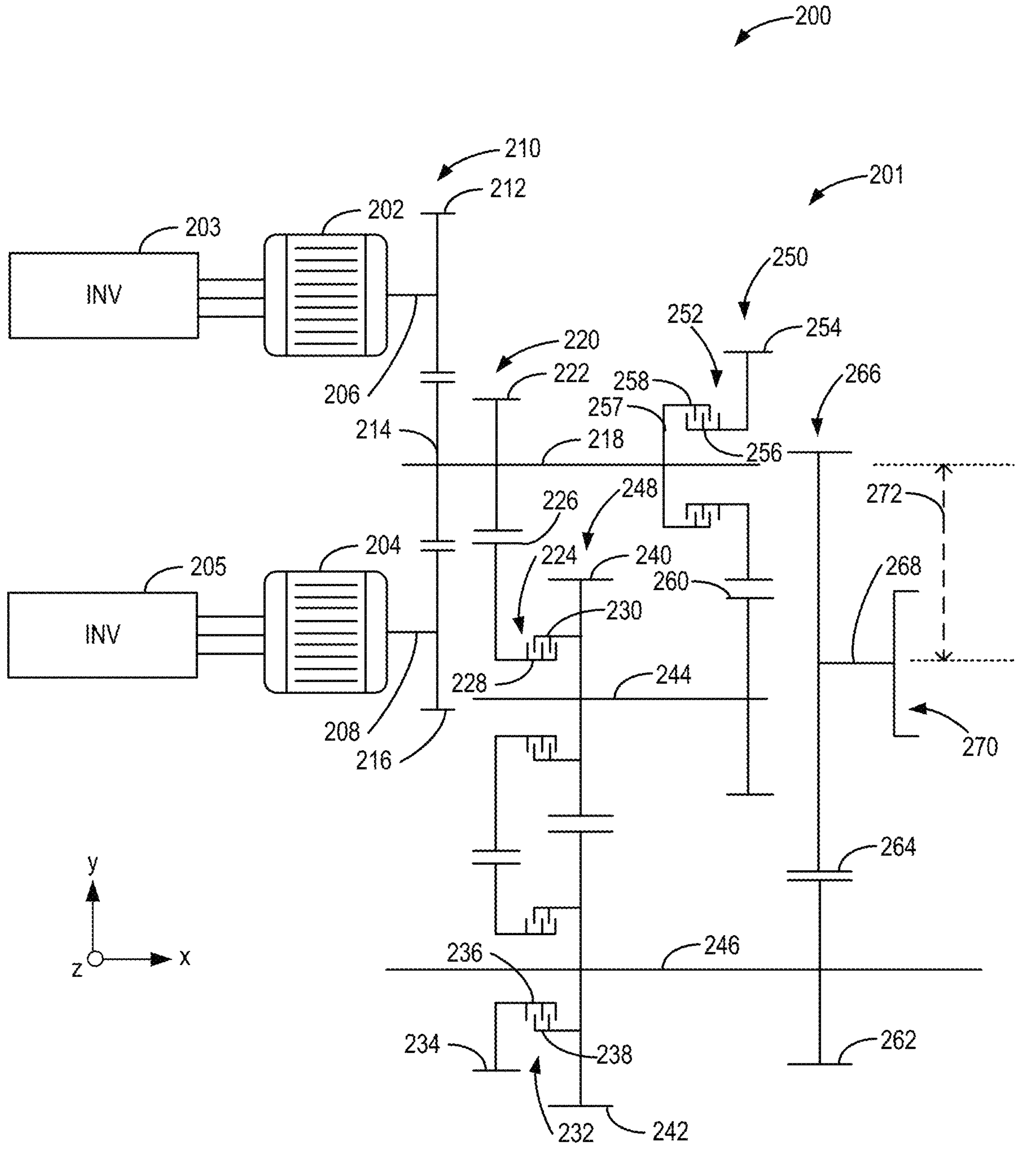
FIG. 2 shows a schematic of a three-speed transmission system according to a first embodiment with an output in first position.
Figure 3:
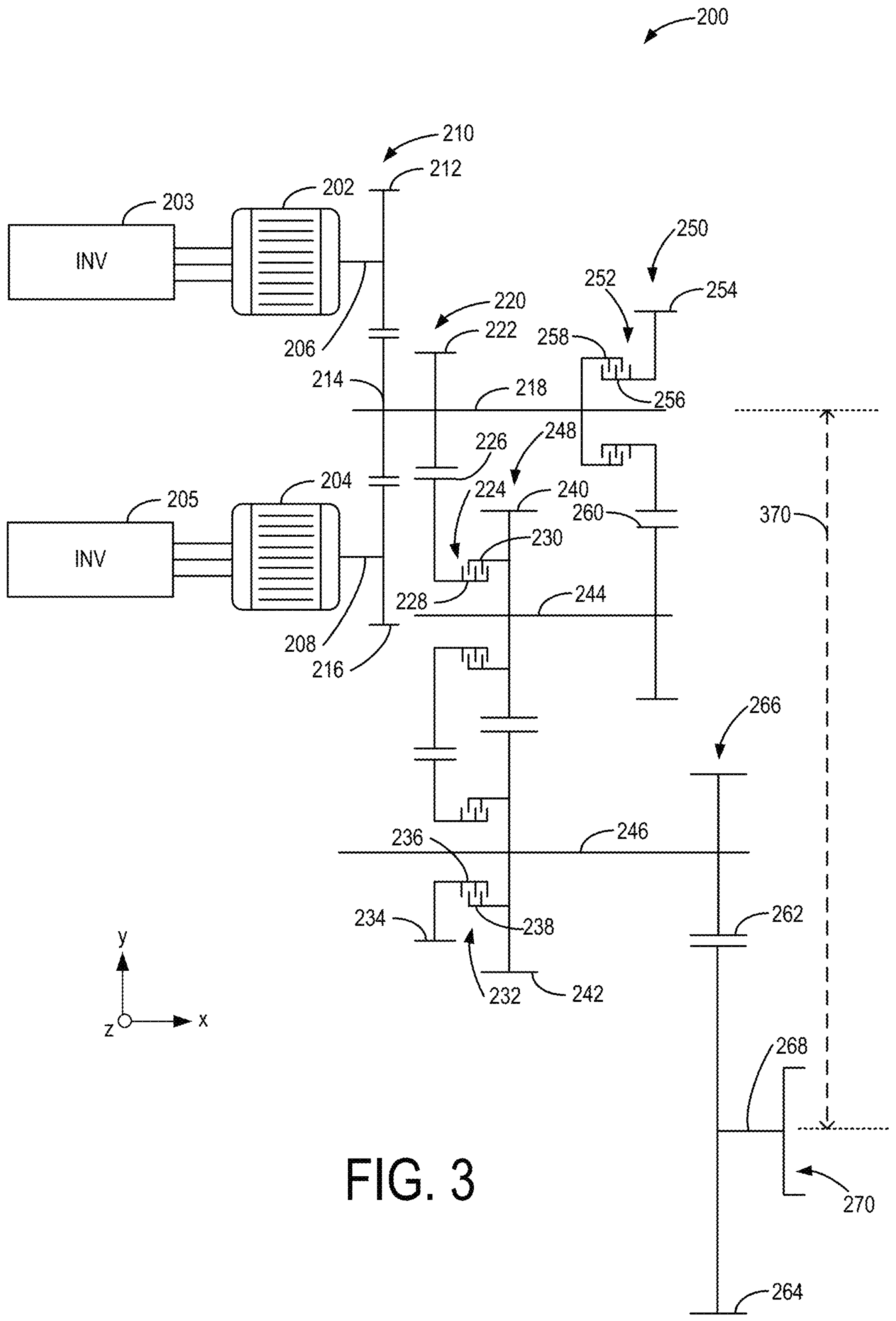
FIG. 3 shows a schematic of the three-speed transmission system according to the first embodiment with the output in a second position.
Figure 4A:
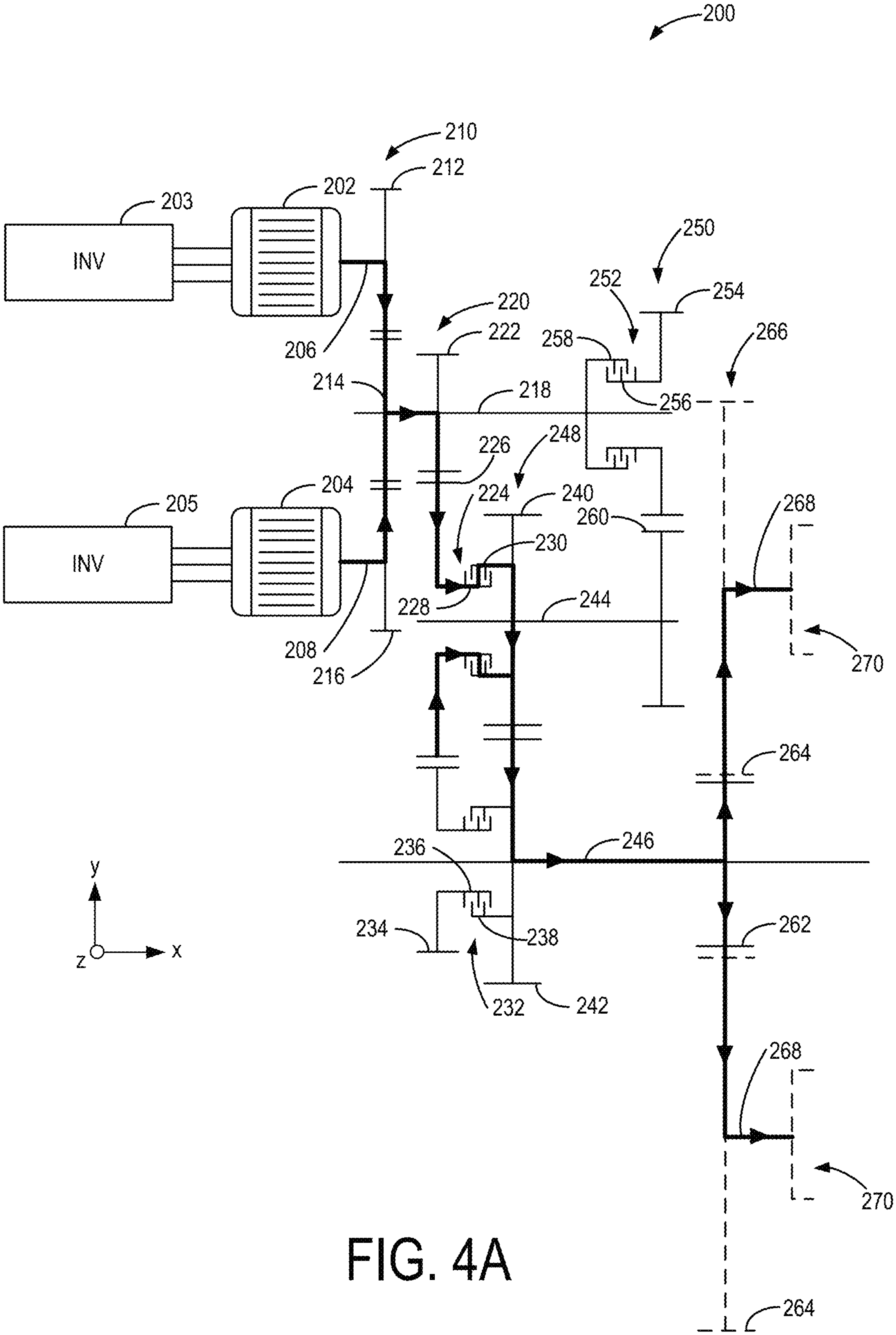
FIG. 4A shows a power path in the three-speed transmission system of FIG. 2 in a first operating gear ratio.
Figure 4B:
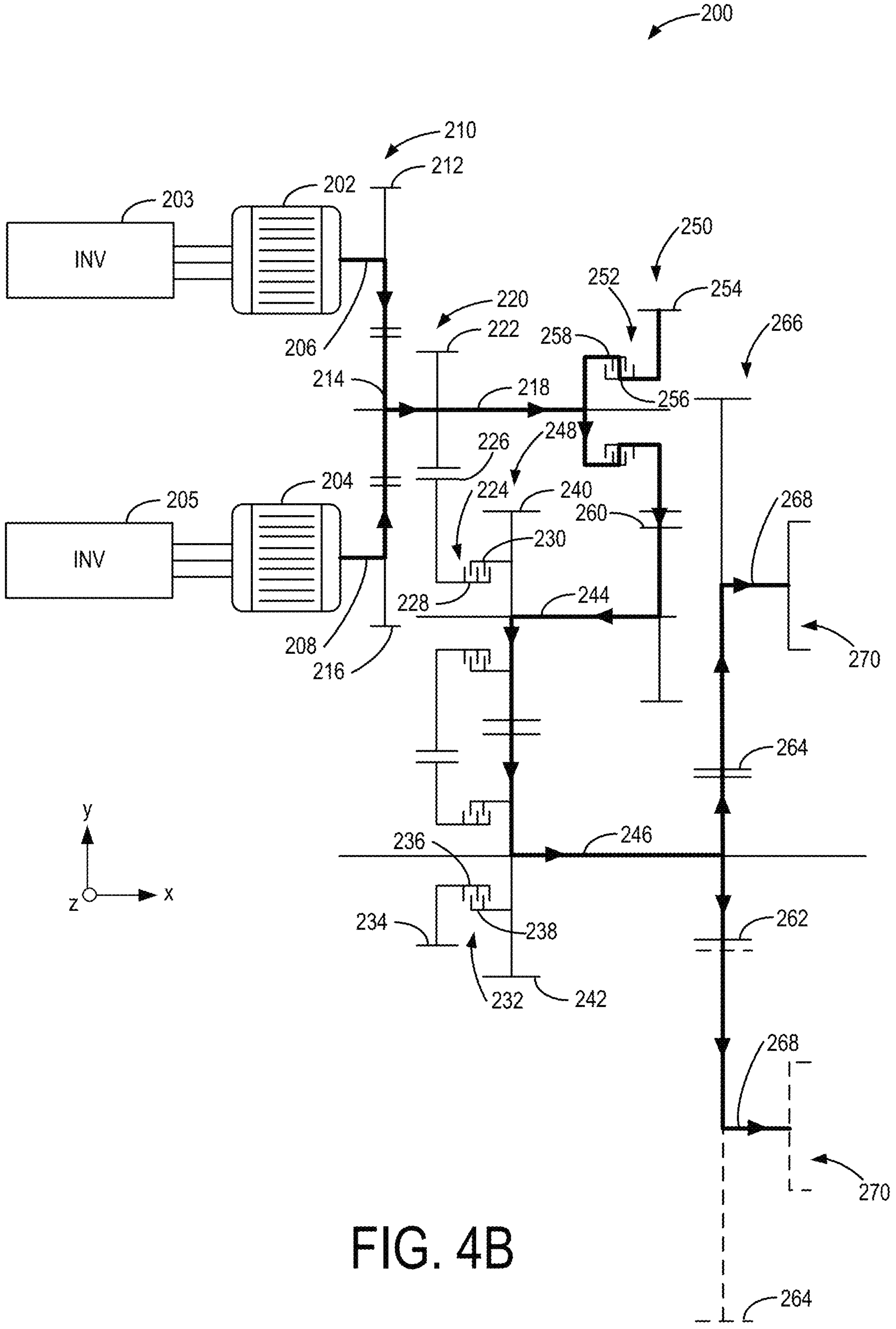
FIG. 4B shows a power path in the three-speed transmission system of FIG. 2 in a second operating gear ratio.
Figure 4C:
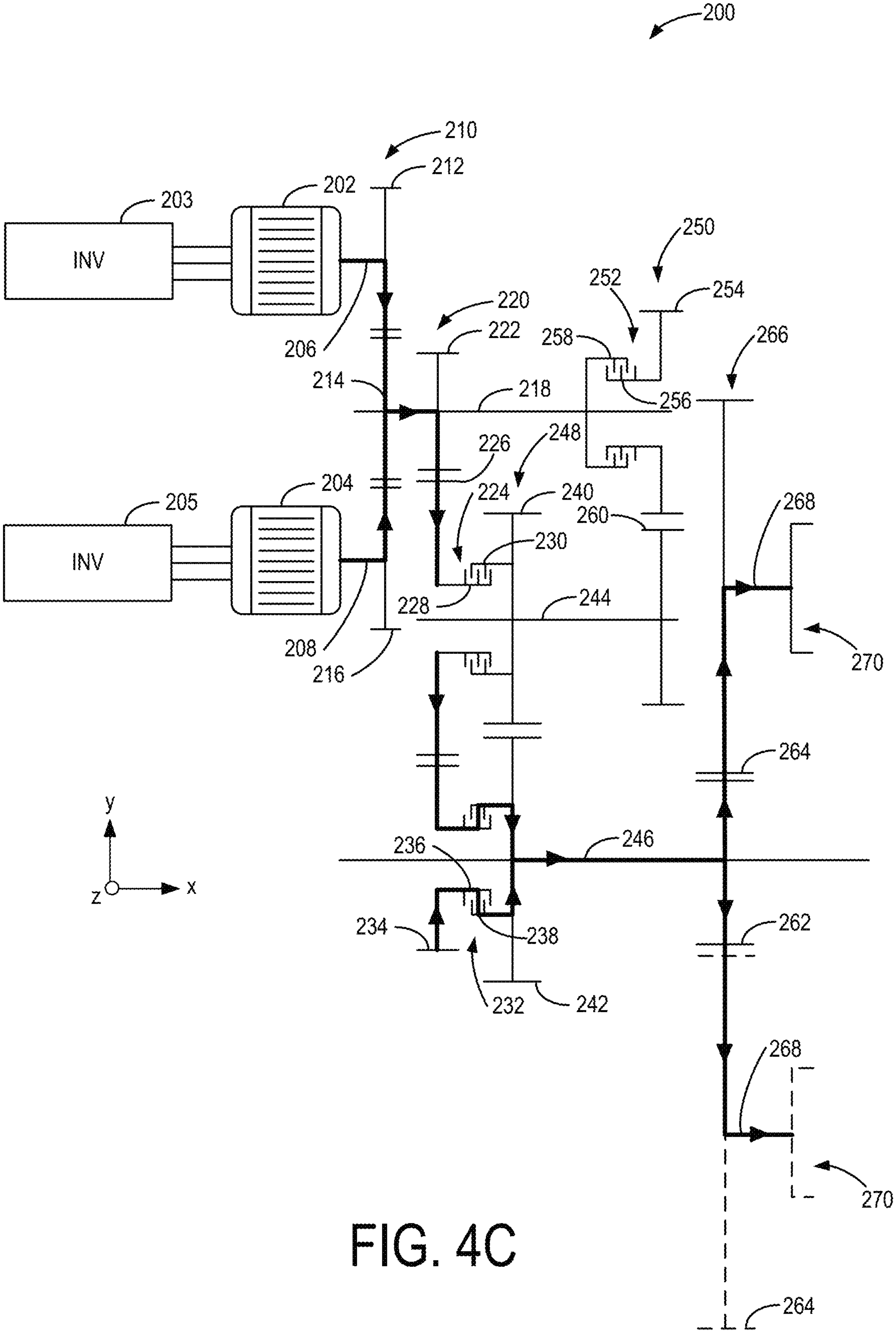
FIG. 4C shows a power path in the three-speed transmission system of FIG. 2 in a third operating gear ratio.

An exemplary electric vehicle is shown in FIG. 1. A first configuration of the layout of the transmission with the output shaft in a short drop arrangement is depicted in FIG. 2. A second configuration of the layout of the transmission with the output shaft in a long drop arrangement is depicted in FIG. 3. Power paths through the transmission system for a first, second, and third gear ratio are shown in FIGS. 4A, 4B, and 4C, respectively. A method of operation of the transmission system is shown in a flowchart in FIG. 5. Clutch engagements for the first, second, and third gear ratios are shown in a table in FIG. 6.

FIGS. 1-4C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face0sharing contact with each other may be referred to as in face-sharing contact. As another example, elements positioned apart from each other with only a space there-between and no other components may be there-between may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

Turning now to the figures, FIG. 1 shows a schematic depiction of a vehicle system 106 that can derive propulsion power from one or more electric motors 154 (e.g., a drive motor). In some examples, the vehicle system 106 may be a front loader or compact wheel loader vehicle system. In one example, electric motors 154 may be traction motors. Electric motors 154 receive electrical power from a traction battery 158 to provide torque to rear vehicle wheels 157 via transmission 155. Electric motors 154 may also be operated as a generator to provide electrical power to charge traction battery 158, for example, during a braking operation. It should be appreciated that while FIG. 1 depicts electric motors 154 and transmission 155 mounted in a rear wheel drive configuration, other configurations are possible, such as employing the electric motor 154 in a front wheel configuration, or in a configuration in which a first output yoke or other interface drives the rear vehicle wheels 157 and a second output yoke or other interface drives front vehicle wheels 156.

Electric motors 154 and transmission 155 may be included as part of an electric drive unit. In some examples, the electric motors 154 may be integrated with a gearbox of the transmission 155. Additionally or alternatively, the electric motors 154 may be coupled to an outside of a transmission/gearbox housing. The transmission/gearbox may include at least one clutch and one or more shafts, as will be described below. Controller 112 may send a signal to an actuator of the clutch(es) to engage or disengage the clutch (es), so as to couple or decouple power transmission from the electric motors 154 to various shafts and gears therein.

Controller 112 may form a portion of a control system 114. Control system 114 is shown receiving information from a plurality of sensors 116 and sending control signals to a plurality of actuators 181. As one example, sensors 116 may include sensors such as a battery state of charge sensor, clutch pressure sensor, speed sensors, etc. As another example, the actuators may include the clutch(es), etc. The controller 112 may receive input data from the various sensors, process the input data, and trigger the actuators in response to the processed input data based on instruction or code programmed therein corresponding to one or more routines.

Turning now to FIGS. 2 and 3, a schematic layout of an exemplary electric transmission system 200 is shown. For reference, an axis system is provided in FIG. 2, as well as in FIGS. 3-4C. The y-axis may be a vertical axis (e.g., parallel to a gravitational axis), the x-axis may be a lateral axis (e.g., a horizontal axis), and/or the z-axis may be a longitudinal axis. However, the axes may have other orientations in other examples, for the y-axis may be a lateral axis and the x-axis may be a vertical axis. The transmission system 200 is shown in FIG. 2 with an output in a first position, according to the first configuration of the system herein disclosed. The transmission system 200 is shown in FIG. 3 with the output in a second position, according to the second configuration of the system herein disclosed. In some examples, the transmission system 200 herein described may be a single drum design. The components of the transmission system 200 are shared in the first and second configurations and thus will not be reintroduced in the description of FIG. 3, for brevity.

The electric transmission system 200 may comprise a first electric motor 202, a second electric motor 204, and a multi-speed transmission 201 (e.g., a three-speed transmission) and may therefore be a multi-speed (e.g., three-speed) transmission system. The transmission system 200 may comprise a plurality of clutches, including a first clutch 224, a second clutch 252, and a third clutch 232, and a plurality of shafts, including an input shaft 218, a first clutch shaft 244, a second clutch shaft 246, and an output shaft 268. The plurality of shafts are rotationally coupled via a plurality of gears, as will be herein described. The gears of the transmission system 200 may be conceptually partitioned into a plurality of gear trains, including a first gear train 210, a second gear train 220, a third gear train 248, a fourth gear train 250, and a fifth gear train 266.

The first and second electric motors 202, 204 may include conventional components such as rotors and stators that electromagnetically interact during operation to generate motive power. Further, in one example, the electric motors may be motor-generators which are designed to generate electrical energy during regenerative operation. Still further, the electric motors may have similar designs and sizes, in some instances. In this way, manufacturing efficiency may be increased. However, the electric motors may have differing sizes and/or designs in alternate examples.

Each of the first and second electric motors 202, 204 may be configured to provide a desired amount of tractive power for operation of the vehicle, such as vehicle system 106, as well as a target top speed and speed on ramp. The use of multiple motors in the system therefore enables the system to attain end-use performance goals. Each of the first and second electric motors 202, 204 may be electrically coupled to one or more energy storage devices (e.g., one or more traction batteries, capacitor(s), fuel cells, combinations thereof, and the like) by way of first inverter 203 and second inverter 205, respectively. These inverters and other inverters herein described are designed to convert direct current (DC) to alternating current (AC) and vice versa. In one use-case example, the first and second electric motors 202, 204 and the respective first and second inverters 203, 205 may be three-phase devices. However, motors and inverters designed to operate using more than three phases have been envisioned.

The first electric motor 202 may comprise a first rotor shaft 206 that rotationally couples to the multi-speed transmission 201 for transfer of mechanical/rotational power from the first electric motor 202 into the multi-speed transmission 201. Similarly, the second electric motor 204 may comprise a second rotor shaft 208 that rotationally couples to the multi-speed transmission 201. Each of the first and second rotor shafts 206 and 208 may be rotationally coupled to the first gear train 210. The first gear train 210 may comprise a gear 212, a gear 214, and a gear 216 coupled in series to form the train. For example, the first rotor shaft 206 may rotationally couple to gear 212, which meshes with gear 214, and the second rotor shaft 208 may rotationally couple to gear 216, which also meshes with gear 214. The first gear train therefore comprises gears 212, 214, and 216. In the depicted example layout shown in the first embodiment, as well as the second embodiment shown in FIG. 3, the first electric motor 202 is arranged vertically above the second electric motor 204. However, it should be appreciated that alternative arrangements are possible without departing from the scope of this disclosure. For example, the first and second motors may be arranged along a shared horizontal axis and may be arranged vertically above the transmission 201.

The first and second electric motors 202, 204 may output a relatively high torque due to high input speeds. The first gear train 210 may be configured as an input speed reduction gear train. One embodiment of a method for an input reduction gear train is described. One or more drive input shafts (e.g., one or both of the first and second rotor shafts 206, 208) rotates at an input speed. When two shift elements of the input speed reduction gear train are engaged (e.g., meshed), the output shaft of the reduction ear train (e.g., input shaft 218) rotates at an output speed. The output speed may be lower than the input speed, thus allowing for the input speed to be high without resulting in high output speeds. Reducing high input speeds through the transmission may mitigate degradation to components of the transmission system, such as clutches, gears, bearings, and the like. Reducing high input speeds may also reduce size of the gears of the system, thereby reducing an overall package size.

The gear 214 of the first gear train 210 may rotationally couple to input shaft 218. The input shaft 218 may further rotationally couple to the second gear train 220 via gear 222. The second gear train 220 may comprise the gear 222, first clutch gear 226 of the first clutch 224, and third clutch gear 234 of the third clutch 232. The gear 222 may mesh with the first clutch gear 226 which may further mesh with the third clutch gear 234.

The first clutch 224 may comprise a first clutch hub 228 and a first clutch drum 230 that selectively engage when the first clutch 224 is engaged. When the first clutch 224 is engaged, the transmission system 200 may be in the first gear ratio. The first clutch hub 228 may fixedly couple to or otherwise be formed as part of the first clutch gear 226. The first clutch drum 230 may fixedly couple to or otherwise be formed as part of gear 240 of the third gear train 248. For example, the first clutch drum 230 may be welded to the gear 240. The gear 240 may rotationally couple to the first clutch shaft 244 and may mesh with gear 242 also of the third gear train 248. The third clutch 232 may comprise a third clutch hub 236 and a third clutch drum 238 that selectively engage when the third clutch 232 is engaged. When the third clutch 232 is engaged, the transmission system 200 may be in the third gear ratio. The third clutch hub 236 may fixedly couple to or otherwise be formed as part of the third clutch gear 234. The third clutch drum 238 may fixedly couple to or otherwise be formed as part of gear 242 of the third gear train 248. For example, the third clutch drum 238 may be welded to the gear 242. The gear 242 may rotationally couple to the second clutch shaft 246. Thus, the first clutch shaft 244 may rotationally couple to the second clutch shaft 246 via the gear 240 and the gear 242 of the first clutch 224 and the third clutch 232, respectively.

The second clutch shaft 246 may additionally rotationally couple to the fifth gear train 266 via gear 262. The fifth gear train 266 may comprise the gear 262 and output gear 264. Output gear 264 may rotationally couple to output shaft 268, which may couple to one or more output interfaces 270. The one or more output interfaces may be designed to attach to axles (not shown) via shafts, couplings, changes, combinations thereof, and/or the like. Such axles may include components such as differentials, axle shafts, and drive wheels (e.g., front vehicle wheels 156 and rear vehicle wheels 157 of FIG. 1). The output shaft 268 may thus be configured to transfer rotational torque to the axles. The output interfaces 270 may be flanges, yokes, splines, joints, combinations thereof, or the like.

The input shaft 218 may selectively couple to the second clutch 252 when the second clutch 252 is engaged. Therefore, when the second clutch 252 is engaged, the input shaft 218 may rotationally couple to the fourth gear train 250. When the second clutch 252 is engaged, the transmission system 200 may be in the second gear ratio. The fourth gear train 250 may comprise second clutch gear 254 and gear 260 with which the second clutch gear 254 meshes. Similar to the first and third clutches previously described, the second clutch 252 may comprise a second clutch hub 256 and a second clutch drum 258. The second clutch hub 256 and the second clutch drum 258 may selectively engage when the second clutch 252 is engaged. The second clutch drum 258 may be fixedly coupled to or otherwise formed as part of a gear 257 (e.g., a hub gear) which is rotationally coupled to the input shaft 218. For example, the second clutch drum 258 may be welded to the gear 257. As such, when the second clutch 252 is engaged, the input shaft 218 may transfer rotational torque to the gear 260, which is rotationally coupled to the first clutch shaft 244.

Thus, the input shaft 218 may be selectively rotationally coupled to the first clutch shaft 244 via the first clutch gear 226, which couples to gear 222 fixedly rotationally coupled to the input shaft 218, when the first clutch 224 is engaged and the transmission system 200 is in the first gear ratio. Alternatively, the input shaft 218 may be selectively rotationally coupled to the first clutch shaft 244 via the second clutch gear 254, which couples to gear 260 fixedly rotationally coupled to the first clutch shaft 244, when the second clutch 252 is engaged and the transmission system 200 is in the second gear ratio. Further, the input shaft 218 may be selectively rotationally coupled to the second clutch shaft 246 via the third clutch gear 234, which rotationally couples to the first clutch gear 226 and to gear 222 which fixedly rotationally couples to the input shaft 218, when the third clutch 232 is engaged and the transmission system 200 is in the third gear ratio.

Gear 262 may mesh with output gear 264 in one of two positions, according to the first and second embodiments herein disclosed. In the first embodiment, as shown in FIG. 2, output gear 264 meshes with the gear 262 in the first position, as previously noted. The first position may be with the output gear 264 vertically above the gear 262, and thus vertically above the second clutch shaft 246 and closer to an axis of the input shaft 218. For example, the output shaft 268 may be arranged a first distance 272 from the axis of the input shaft 218. The first position may thus define a short drop configuration for the output shaft 268. The short drop configuration may be utilized in applications that demand a short drop between the transmission and the axles, for example in applications in which the transmission is positioned in a vertical position close to an axis of the axles.

The first, second, and third clutches, as herein described, may be wet friction clutches, in some examples. In other examples, the clutches may be dog clutches, dry friction clutches, or other type of clutch. Wet friction clutches may allow for a smoother transition between engagement and disengagement, as compared to dog clutches. Further, lubrication of wet friction clutches may decrease degradation to the clutch over time, thereby increasing the longevity of the transmission system.

Turning now to FIG. 3, the transmission system 200 is shown according to the second embodiment of the present disclosure. As described above, the components of the transmission system 200 are unchanged compared to the first embodiment presented in FIG. 2 and are thus given similar component numbering. The transmission system 200 as depicted in FIG. 3 includes the output shaft 268 in the second position, as previously noted.

In the second position, output gear 264 may mesh with the gear 262 such that the output gear 264 is vertically below the gear 262. As such, the output shaft 268 may be positioned further vertically below the axis of the input shaft 218 than when in the first position. For example, a second distance 370 between the axis of the input shaft 218 and the axis of the output shaft 268 when the output shaft 268 and output gear 264 are in the second position may be longer than the first distance 272 between the axis of the input shaft 218 and the axis of the output shaft 268 when the output shaft 268 and output gear 264 are in the first position. In this way, the second position of the output shaft 268 may be a long drop configuration of the transmission system 200. The long drop configuration may allow for the transmission system to be utilized for applications that demand a long drop between a main section of the transmission (e.g., the axis of the input shaft) and the output. For example, loaders may demand a long drop due to the transmission being assembled/positioned vertically higher with respect to the axles.

In some examples, the transmission system 200 may be assembled in one of the first configuration (the short drop configuration of the first embodiment) and the second configuration (the long drop configuration of the second embodiment) to fit an intended vehicle platform. In this way, manufacture of the transmission system 200 may be streamlined and tailored to the intended vehicle platform, thereby mitigating demand to manufacture separate transmission systems with different components for different applications.

Referring now to FIGS. 4A-4C, power paths through the transmission system 200 are shown. Power paths are provided for both potential configurations of the transmission system 200, for example with the output arranged in either the first or second configuration as described above. FIG. 4A specifically shows a power path through the transmission system 200 when in the first gear ratio, FIG. 4B specifically shows a power path through the transmission system 200 when in the second gear ratio, and FIG. 4C specifically shows a power path through the transmission system 200 when in the third gear ratio.

In the power path of the first gear ratio as depicted in FIG. 4A, power of the first and second electric motors 202, 204 is transferred into the input shaft 218 via the first and second rotor shafts 206, 208 and the first gear train 210. For example, power of the first electric motor 202 may be transferred from the first rotor shaft 206 into the gear 212, from gear 212 to gear 214, and from gear 214 to input shaft 218. Power of the second electric motor 204 may be transferred from the second rotor shaft 208 into the gear 216, from gear 216 to gear 214, and from gear 214 to input shaft 218. Power is then transferred from the input shaft 218 into the first clutch 224 via gear 222 when the first clutch 224 is engaged. From the first clutch 224, power is transferred into the gear 240, from the gear 240 into the gear 242, and from gear 242 to second clutch shaft 246. From the second clutch shaft 246, power is transferred to gear 262, from gear 262 to output gear 264, and from output gear 264 to output shaft 268. Power is then transferred from the output shaft 268 to output interfaces 270 and to downstream components thereafter.

In the power path of the second gear ratio as depicted in FIG. 4B, power of the first and second electric motors 202, 204 is transferred into the input shaft 218 via the first gear train 210, similar to as described above. From the input shaft 218, power is transferred into the second clutch 252 when engaged. From the second clutch 252, power is transferred into the second clutch gear 254 and into gear 260. Power is then transferred from gear 260 into first clutch shaft 244 and into third gear train 248 (e.g., gears 240 and 242). From gear 242, power is transferred into second clutch shaft 246 and into gear 262, from gear 262 into output gear 264 and from output gear 264 into the output shaft 268. From the output shaft 268, power is transferred to output interfaces 270 and to downstream components thereafter.

In the power path of the third gear ratio as depicted in FIG. 4C, power of the first and second electric motors 202, 204 is transferred into the input shaft 218 via the first gear train 210 similar to as described above. From the input shaft 218, power is transferred into the second gear train 220, specifically into gear 222, through first clutch gear 226, and into third clutch gear 234. Power is then transferred through the third clutch 232, when engaged, and into the second clutch shaft 246. From the second clutch shaft 246, power is transferred to gear 262, from gear 262 to output gear 264, and from output gear 264 to output shaft 268. Power is then transferred from the output shaft 268 to output interfaces 270 and to downstream components thereafter.

Figure 5:
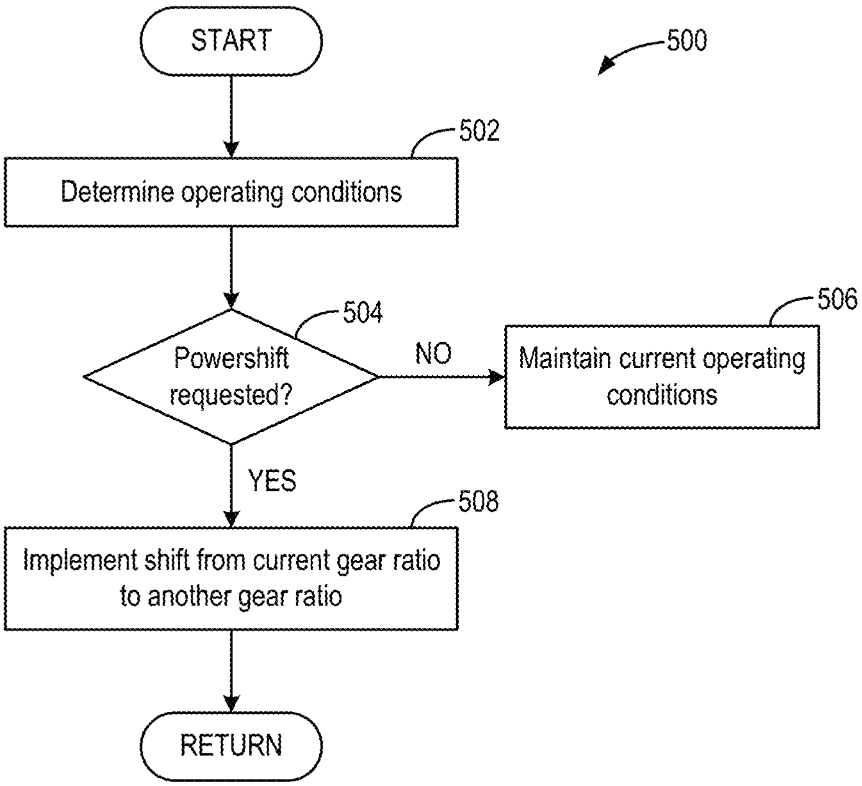
FIG. 5 shows a flowchart illustrating a method of operation of the three-speed transmission system.

Referring now to FIG. 5, a flowchart illustrating a method 500 for operation of a transmission system is shown. For example, the transmission system 200 described with respect to FIGS. 2-4C may be operated according to the method 500 as herein presented. However, the method 500 may be carried out via other suitable transmissions, in other examples. Furthermore, the method 500 may be implemented by a controller than includes a processor and memory, according to instructions stored in the memory that are executable by the processor. For example, the method 500 may be implemented by the control system 114 described with respect to FIG. 1 in response to signals received from sensors (e.g., clutch pressure sensor, speed sensors, etc.).

At 502, method 500 includes determining operating conditions. The operating conditions may include input device positions (e.g., gearshift level positions), clutch configurations(s), including which clutches are engaged and which clutches are disengaged, output speed, motor speeds, motor torques, total output torque, vehicle speed, vehicle load, ambient temperature, and the like. The operating conditions may be ascertained via sensor inputs, modeling, look-up tables, and other suitable techniques.

At 504, method 500 includes judging if a powershift in the transmission should be implemented for selective shifting of one or more clutches of respective motor-transmission subassemblies of the transmission system. Such a determination may be carried out responsive to vehicle speed surpassing a threshold value, actual output torque, and/or accelerator pedal position, in some examples. In other examples, operator interaction with a gear selector and/or clutch actuator may initiate powershift operation.

If it is determined that a powershift should not occur (NO at 504), the method proceeds to 506 where the method 500 includes maintaining the current transmission operating conditions of the transmission system. For instance, the transmission system may be maintained in the first gear ratio when motor speed and vehicle speed remains below a threshold for shifting to the second or third gear ratio.

Conversely, if it is determined that a powershift should occur (YES at 504), the method 500 moves to 508 where the method 500 includes shifting the gear ratio from a current gear ratio to another gear ratio. As noted, the transmission system 200 as herein disclosed may include three gear ratios: a first gear ratio, a second gear ratio, and a third gear ratio. Determining the operating conditions at 502 may include determining current gear ratio as well as current clutch positions (e.g., engaged or disengaged). As an example, a current gear ratio may be a first gear ratio and shifting may comprise a powershift from the first gear ratio to a second gear ratio by way of disengaging the first clutch and engaging the second clutch. As another example, a current gear ratio may be the second gear ratio and shifting may comprise a powershift from the second gear ratio to the third gear ratio by way of disengaging the second clutch and engaging the third clutch. Powershifting may comprise shifting from one gear to another with little to no power or torque interruption.

Available gear ratios and clutch engagements thereof are shown in FIG. 6. FIG. 6 shows a table 600 of clutch engagements for gear ratios for both configurations of the transmission system 200 herein described. In the first gear ratio, a first clutch (e.g., first clutch 224) is engaged while a second clutch (e.g., second clutch 252) and a third clutch (e.g., third clutch 232) are disengaged. In the second gear ratio, the first clutch is disengaged, the second clutch is engaged, and the third clutch is disengaged. In the third gear ratio, the first and second clutches are disengaged and the third clutch is engaged.

The technical effect of the systems and methods described herein is that the transmission system, in either described configuration, may have three available gear ratios for three available speeds. The available configurations, including a short drop configuration and a long drop configuration may provide increased flexibility as the transmission may be configured for the specific intended application based on a demanded distance between the axis of the input shaft and the axis of the output shaft. Further, inclusion of an input speed reduction gear set may mitigate degradation to components of the transmission system by decreasing output speeds through the transmission.

The disclosure also provides support for a transmission system, comprising: a first electric motor coupled to an input speed reduction gear train, wherein the input speed reduction gear train rotationally couples to an input shaft, a second electric motor coupled to the input speed reduction gear train, a first clutch positioned on a first clutch shaft, a second clutch positioned on the input shaft, a third clutch positioned on a second clutch shaft, and an output shaft rotationally coupled to the second clutch shaft, wherein the output shaft is in one of a first position and a second position. In a first example of the system, the first position is a short drop configuration wherein an axis of the output shaft is a first distance from an axis of the input shaft, and the second position is a long drop configuration wherein the axis of the output shaft is a second, further distance from the axis of the input shaft. In a second example of the system, optionally including the first example, the input speed reduction gear train comprises a first gear, a second gear, and a third gear coupled in series, wherein the first gear couples to the first electric motor, the second gear rotationally couples to the input shaft, and the third gear couples to the second electric motor. In a third example of the system, optionally including one or both of the first and second examples, the input shaft is selectively rotationally coupled to the first clutch shaft via a first clutch gear of the first clutch when the first clutch is engaged and via a second clutch gear of the second clutch when the second clutch is engaged. In a fourth example of the system, optionally including one or more or each of the first through third examples, the input shaft is selectively rotationally coupled to the second clutch shaft via a third clutch gear of the third clutch when the third clutch is engaged. In a fifth example of the system, optionally including one or more or each of the first through fourth examples, the first clutch shaft is rotationally coupled to the second clutch shaft via a first gear of the first clutch and a second gear of the third clutch, wherein the first gear and the second gear are meshed. In a sixth example of the system, optionally including one or more or each of the first through fifth examples when the first clutch is engaged and the second and third clutches are disengaged, the transmission system is in a first gear ratio, when the second clutch is engaged and the first and third clutches are disengaged, the transmission system is in a second gear ratio, and when the third clutch is engaged and the first and second clutches are disengaged, the transmission system is in a third gear ratio.

The disclosure also provides support for a multi-speed transmission, comprising: an input shaft coupled to a first electric motor and a second electric motor via a first gear train, a first clutch shaft selectively coupled to the input shaft via a third gear train and one of a second gear train and a fourth gear train depending on a selected gear ratio, a second clutch shaft selectively coupled to the first clutch shaft via the second gear train, and an output shaft coupled to the second clutch shaft via a fifth gear train in one of a short drop configuration and a long drop configuration, wherein a first clutch is positioned on the first clutch shaft, a second clutch is positioned on the input shaft, and a third clutch is positioned on the second clutch shaft. In a first example of the system, the first gear train comprises a first gear meshed with a second gear, which also meshes with a third gear, wherein the first gear is rotationally coupled to a first rotor shaft of the first electric motor, the second gear is rotationally coupled to the input shaft, and the third gear rotationally couples to a second rotor shaft of the second electric motor. In a second example of the system, optionally including the first example, the second gear train comprises a first gear fixedly rotationally coupled to the input shaft, a first clutch gear of the first clutch, and a second clutch gear of the third clutch, wherein the first gear meshes with the first clutch gear and the first clutch gear meshes with the second clutch gear. In a third example of the system, optionally including one or both of the first and second examples, the third gear train comprises a first gear of the first clutch, wherein the first gear is fixedly rotationally coupled to the first clutch shaft, and a second gear of the third clutch, wherein the second gear is fixedly rotationally coupled to the second clutch shaft, wherein the first gear meshes with the second gear. In a fourth example of the system, optionally including one or more or each of the first through third examples, the fourth gear train comprises a third clutch gear of the second clutch and a gear fixedly rotationally coupled to the first clutch shaft, wherein the third clutch gear meshes with the gear. In a fifth example of the system, optionally including one or more or each of the first through fourth examples, the fifth gear train comprises a first gear fixedly rotationally coupled to the second clutch shaft and a second gear fixedly rotationally coupled to the output shaft, wherein the first gear meshes with the second gear. In a sixth example of the system, optionally including one or more or each of the first through fifth examples in the short drop configuration, an axis of the output shaft is a first distance from an axis of the input shaft and, in the long drop configuration, the axis of the output shaft is a second, further distance from the axis of the input shaft. In a seventh example of the system, optionally including one or more or each of the first through sixth examples in a first gear ratio, the first clutch is selectively engaged with the first clutch shaft, in a second gear ratio, the second clutch is selectively engaged with the input shaft, and in a third gear ratio, the third clutch is selectively engaged with the second clutch shaft.

The disclosure also provides support for an electric drive unit, comprising: a transmission system comprising: an input shaft, a first clutch shaft, a second clutch shaft, a first clutch configured to selectively engage the first clutch shaft, a second clutch configured to selectively engage the input shaft, a third clutch configured to selectively engage the second clutch shaft, and an output shaft coupled to the second clutch shaft, wherein the output shaft is positioned in one of a first and second position relative to the input shaft, and one or more electric motors, wherein each of the one or more electric motors is coupled to the input shaft of the transmission system. In a first example of the system, the first position is a short drop configuration wherein an axis of the output shaft is a first distance from an axis of the input shaft, and the second position is a long drop configuration wherein the axis of the output shaft is a second, further distance from the axis of the input shaft. In a second example of the system, optionally including the first example, the input shaft is rotationally coupled to the first clutch shaft via the first clutch when the first clutch is engaged with the first clutch shaft. In a third example of the system, optionally including one or both of the first and second examples, the input shaft is rotationally coupled to the first clutch shaft via the second clutch when the second clutch is engaged with the input shaft. In a fourth example of the system, optionally including one or more or each of the first through third examples, the input shaft is rotationally coupled to the second clutch shaft via the third clutch when the third clutch is engaged with the second clutch shaft.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:

a first electric motor coupled to an input speed reduction gear train, wherein the input speed reduction gear train rotationally couples to an input shaft;

a second electric motor coupled to the input speed reduction gear train;

a first clutch positioned on a first clutch shaft;

a second clutch positioned on the input shaft;

a third clutch positioned on a second clutch shaft; and an output shaft rotationally coupled to the second clutch shaft, wherein the output shaft is in one of a first position and a second position;

wherein the first clutch includes a first gear that meshes with a second gear that is coupled to the input shaft; and wherein the second clutch includes a third gear that meshes with a fourth gear that is coupled to the first clutch shaft.

2. The transmission system of claim 1, wherein the first position is a short drop configuration wherein an axis of the output shaft is a first distance from an axis of the input shaft, and the second position is a long drop configuration wherein the axis of the output shaft is a second, further distance from the axis of the input shaft.

3. The transmission system of claim 1, wherein the input speed reduction gear train comprises a first gear, a second gear, and a third gear coupled in series, wherein the first gear couples to the first electric motor, the second gear rotationally couples to the input shaft, and the third gear couples to the second electric motor.

4. The transmission system of claim 1, wherein the input shaft is selectively rotationally coupled to the first clutch shaft via a first clutch gear of the first clutch when the first clutch is engaged and via a second clutch gear of the second clutch when the second clutch is engaged.

5. The transmission system of claim 1, wherein the input shaft is selectively rotationally coupled to the second clutch shaft via a third clutch gear of the third clutch when the third clutch is engaged.

6. The transmission system of claim 1, wherein the first clutch shaft is rotationally coupled to the second clutch shaft via a first gear of the first clutch and a second gear of the third clutch, wherein the first gear and the second gear are meshed.

7. The transmission system of claim 1, wherein, when the first clutch is engaged and the second and third clutches are disengaged, the transmission system is in a first gear ratio, when the second clutch is engaged and the first and third clutches are disengaged, the transmission system is in a second gear ratio, and when the third clutch is engaged and the first and second clutches are disengaged, the transmission system is in a third gear ratio.

8. A multi-speed transmission, comprising:

an input shaft coupled to a first electric motor and a second electric motor via a first gear train;

a first clutch shaft selectively coupled to the input shaft via a third gear train and one of a second gear train and a fourth gear train depending on a selected gear ratio;

a second clutch shaft selectively coupled to the first clutch shaft via the second gear train; and an output shaft coupled to the second clutch shaft via a fifth gear train in one of a short drop configuration and a long drop configuration, wherein a first clutch is positioned on the first clutch shaft, a second clutch is positioned on the input shaft, and a third clutch is positioned on the second clutch shaft;

wherein the first clutch includes a first gear that meshes with a second gear that is coupled to the input shaft;

wherein the second clutch includes a third gear that meshes with a fourth gear that is coupled to the first clutch shaft;

wherein the first gear meshes with a fifth gear that is included in the third clutch;

wherein a fifth gear is coupled to or incorporated in the first clutch; and wherein a sixth gear is coupled to or incorporated in the third clutch and meshes with the fifth gear.

9. The multi-speed transmission of claim 8, wherein the first gear train comprises a first gear meshed with a second gear, which also meshes with a third gear, wherein the first gear is rotationally coupled to a first rotor shaft of the first electric motor, the second gear is rotationally coupled to the input shaft, and the third gear rotationally couples to a second rotor shaft of the second electric motor.

10. The multi-speed transmission of claim 8, wherein the second gear train comprises a first gear fixedly rotationally coupled to the input shaft, a first clutch gear of the first clutch, and a second clutch gear of the third clutch, wherein the first gear meshes with the first clutch gear and the first clutch gear meshes with the second clutch gear.

11. The multi-speed transmission of claim 8, wherein the third gear train comprises a first gear of the first clutch, wherein the first gear is fixedly rotationally coupled to the first clutch shaft, and a second gear of the third clutch, wherein the second gear is fixedly rotationally coupled to the second clutch shaft, wherein the first gear meshes with the second gear.

12. The multi-speed transmission of claim 8, wherein the fourth gear train comprises a third clutch gear of the second clutch and a gear fixedly rotationally coupled to the first clutch shaft, wherein the third clutch gear meshes with the gear.

13. The multi-speed transmission of claim 8, wherein the fifth gear train comprises a first gear fixedly rotationally coupled to the second clutch shaft and a second gear fixedly rotationally coupled to the output shaft, wherein the first gear meshes with the second gear.

14. The multi-speed transmission of claim 8, wherein, in the short drop configuration, an axis of the output shaft is a first distance from an axis of the input shaft and, in the long drop configuration, the axis of the output shaft is a second, further distance from the axis of the input shaft.

15. The multi-speed transmission of claim 8, wherein, in a first gear ratio, the first clutch is selectively engaged with the first clutch shaft, in a second gear ratio, the second clutch is selectively engaged with the input shaft, and in a third gear ratio, the third clutch is selectively engaged with the second clutch shaft.

16. An electric drive unit, comprising:

a transmission system comprising:

an input shaft;

a first clutch shaft;

a second clutch shaft;

a first clutch configured to selectively engage the first clutch shaft;

a second clutch configured to selectively engage the input shaft;

a third clutch configured to selectively engage the second clutch shaft; and an output shaft coupled to the second clutch shaft, wherein the output shaft is positioned in one of a first and second position relative to the input shaft; and one or more electric motors, wherein each of the one or more electric motors is coupled to the input shaft of the transmission system;

wherein the first clutch includes a first gear that meshes with a second gear that is coupled to the input shaft;

wherein the second clutch includes a third gear that meshes with a fourth gear that is coupled to the first clutch shaft;

wherein the first gear meshes with a fifth gear that is included in the third clutch;

wherein a fifth gear is coupled to or incorporated in the first clutch; and wherein a sixth gear is coupled to or incorporated in the third clutch and meshes with the fifth gear.

17. The electric drive unit of claim 16, wherein the first position is a short drop configuration wherein an axis of the output shaft is a first distance from an axis of the input shaft, and the second position is a long drop configuration wherein the axis of the output shaft is a second, further distance from the axis of the input shaft.

18. The electric drive unit of claim 16, wherein the input shaft is rotationally coupled to the first clutch shaft via the first clutch when the first clutch is engaged with the first clutch shaft.

19. The electric drive unit of claim 16, wherein the input shaft is rotationally coupled to the first clutch shaft via the second clutch when the second clutch is engaged with the input shaft.

20. The electric drive unit of claim 16, wherein the input shaft is rotationally coupled to the second clutch shaft via the third clutch when the third clutch is engaged with the second clutch shaft.

* * * * *